US012371992B2

(12) United States Patent
Jensen et al.

(10) Patent No.: US 12,371,992 B2
(45) Date of Patent: Jul. 29, 2025

(54) AUTOMATED ANALYSIS OF PRESSURE DATA (71) Applicant: Schlumberger Technology Corporation, Sugar Land, TX (US)

(72) Inventors: Melanie Jensen, Cambridge, MA (US); Jeffrey Miles, Arlington, MA (US); Julian Pop, Houston, TX (US); Anirban Mondal, Sugar Land, TX (US); Kashyap Gupta, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/743,278

(22) Filed: Jun. 14, 2024

(65) Prior Publication Data
US 2024/0418083 A1    Dec. 19, 2024

Related U.S. Application Data (60) Provisional application No. 63/508,118, filed on Jun. 14, 2023.

(51) Int. Cl.
*E21B 49/08* (2006.01)
*E21B 47/06* (2012.01)

(52) U.S. Cl.
CPC .......... *E21B 49/087* (2013.01); *E21B 47/06* (2013.01); *E21B 49/0875* (2020.05); *E21B 2200/20* (2020.05)

(58) Field of Classification Search
CPC .... E21B 49/087; E21B 47/06; E21B 2200/20; G01V 20/00
See application file for complete search history.

(56) References Cited

U.S. PATENT DOCUMENTS

| | | | |
|---|---|---|---|
| 11,230,924 B2 | 1/2022 | Pop et al. | |
| 12,123,863 B2* | 10/2024 | Jensen | G01N 33/2823 |
| 2006/0155474 A1* | 7/2006 | Venkataramanan | E21B 49/00 |
| | | | 702/6 |
| 2009/0288881 A1 | 11/2009 | Mullins | |
| 2012/0232859 A1* | 9/2012 | Pomerantz | G01V 1/282 |
| | | | 703/2 |

(Continued)

FOREIGN PATENT DOCUMENTS

| | | | |
|---|---|---|---|
| CN | 113486539 A | 10/2021 | |
| WO | WO-2022051764 A1 * | 3/2022 | E21B 41/00 |

OTHER PUBLICATIONS

Zhou et al., "Reservoir Fluid Evaluation from Real Time Pressure Gradient Analysis: Discussions on Principles, Workflow, and Applications" 2008 SPE Asia Pacific Oil & Gas Conference and Exhibition (Year: 2008).*

(Continued)

*Primary Examiner* — John C Kuan
(74) *Attorney, Agent, or Firm* — Jeffrey D. Frantz (57) ABSTRACT

A method to offer insight on reservoir compartmentalization through the automation of single- and multi-well formation pressure analysis. The method specifically accounts for the measurement uncertainty and any prior information about the reservoir to draw evidence on at least one of a fluid type, a locating feature of the at least one fluid body, vertical compartmentalization, and lateral compartmentalization.

15 Claims, 5 Drawing Sheets (56) References Cited

U.S. PATENT DOCUMENTS

2019/0017352 A1\* 1/2019 Chugunov ............ E21B 49/008
2024/0084699 A1\* 3/2024 Chok .................. E21B 49/0875

OTHER PUBLICATIONS

Dubost et al., Automated Hydraulic Units, Fluid Types, and Free-Fluid Levels Resolved Using New Algorithms Applicable to Distributed Pressure Measurements, SPE-175852-MS, paper presented at the SPE North Africa Technical Conference and Exhibition, Cairo, Egypt, Sep. 2015, 24 pages.

Extended Search Report issued in European Patent Application No. 24182184.2 dated Dec. 20, 2024, 6 pages.

Gallagher, K. et al., "Inference of abrupt changes in noisy geochemical records using transdimensional changepoint models", Earth and Planetary Science Letters, 2011, 311, pp. 182-194.

\* cited by examiner

AUTOMATED ANALYSIS OF PRESSURE DATA

CROSS-REFERENCE TO RELATED APPLICATIONS

The present application claims priority to U.S. Provisional Application 63/508,118, filed Jun. 14, 2023, the entirety of which is incorporated by reference.

FIELD OF THE DISCLOSURE

Aspects of the disclosure relate to measuring pressure in a geological formation. More specifically, aspects of the disclosure relate to an automated analysis of pressure data pertaining to a geological formation.

BACKGROUND

The evaluation of static formation pressure gradients provides insight on the fluid type, fluid contacts, and reservoir compartmentalization. In this context, the term "static" refers to the formation pressure analysis before production at virgin conditions. If two permeable zones are not in pressure communication, the zones are not in flow communication, providing evidence the reservoir is compartmentalized. The opposite logic; however, that pressure communication could be assumed to imply flow communication, has been proven to be incorrect. These interpretations are based on the fact that pressure equilibrium occurs on a time scale that is relatively fast in comparison to the age of the reservoir. Pressure equilibrium can occur quickly across flow barriers even in a reservoir that is compartmentalized for the purposes of fluid production.

The modeling of pressure gradients is done through manual evaluation where formation pressure and depth measurements are obtained using station measurements that are acquired with a downhole probe. The means of conveyance may be a wireline cable, particularly for the most modern formation testers, or Logging While Drilling (LWD) equipment, in non-limiting embodiments. Once the data is obtained, a reservoir engineer first selects which pressure measurements belong to the same hydraulic unit, and then fits a fluid or proxy model to vertically distributed pressure data. Examples of proxy models are low-order polynomials such as a linear model when the fluid density is believed to be constant with depth, or a quadratic model when the fluid density is believed to vary with depth. The reservoir engineer needs to subjectively incorporate the depth and pressure gauge uncertainty when drawing conclusions about vertically compartmentalization in a single well and lateral compartmentalization across multiple wells.

There is a need to provide for more accurate analysis of downhole pressure data so that engineers may accurately predict anticipated conditions.

There is a further need to provide for accurate analysis that is economical for wellsite development.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are; therefore, not to be considered limiting of its scope, for the disclosure may admit to other equally effective embodiments without specific recitation. Accordingly, the following summary provides just a few aspects of the description and should not be used to limit the described embodiments to a single concept.

In one example embodiment, a method for delineating and interpreting a spatial distribution of fluid bodies within a reservoir is disclosed. The method combines domain expert knowledge and knowledge of measurement uncertainties with pressure measurement data. The method may comprise constructing a pressure model that accounts for measurement uncertainty. The method may further comprise choosing a prior distribution on unknown model parameters. The method may further comprise fitting data to the model to produce a fitted model. The method may further comprise using the fitted model to draw evidence on at least one of a fluid type, a locating feature of the at least one fluid body, vertical compartmentalization and lateral compartmentalization.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted; however, that the appended drawings illustrate only typical embodiments of this disclosure and are therefore not be considered limiting of its scope, for the disclosure may admit to other equally effective embodiments.

DETAILED DESCRIPTION

In the following, reference is made to embodiments of the disclosure. It should be understood; however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers, and/or sections, these elements, components, regions, layers and/or sections should not be limited by these terms. These terms may be only used to distinguish one element, components, region, layer, or section from another region, layer, or section. Terms such as "first", "second", and other numerical terms, when used herein, do not imply a sequence or order unless clearly indicated by could be termed a second element, component, region, layer, or section without departing from the teachings of the example embodiments.

When an element or layer is referred to as being "on", "engaged to", "connected to", or "coupled to" another element or layer, it may be directly on, engaged, connected, coupled to the other element or layer, or interleaving elements or layers may be present. In contrast, when an element is referred to as being "directly on", "directly engaged to", "directly connected to", or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood; however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

In the embodiments disclosed, an objective of the method provided are to determine if a single well is vertically compartmentalized and if a pair of wells are laterally disconnected. For both objectives, the method builds a basis of prior knowledge comprising information about the reservoir and the tool specifications. The inclusion of tool specification enables the methods described to specifically account for the measurement uncertainty that occurs within a well and for comparison of measurements between wells. In embodiments, the method then updates this prior information with the measured pressure data. For the single-well case, the method then learns different possible descriptions of the zones of the pressure data. These models can be further investigated to quantify disconnected regions and fluid contacts, along with the fluid density within each discovered zone. In a multi-well case, the method learns whether subsets of wells can be described by the same fluid density and if so, whether there is evidence that each subset of wells are laterally disconnected. For both cases, the method is automated.

One objective of the disclosure is to determine if a single well is vertically compartmentalized and if a subset of wells are laterally disconnected. Aspects of the disclosure automate the pressure gradient analysis through incorporation of domain knowledge and specifically accounting for the tool uncertainty. This will speed up interpretation and decrease the subjectivity introduced by the human hand. It offers quicker insight on reservoir compartmentalization. For both the single-well and multi-well scenarios, aspects of the disclosure automatically determine if differences in formation pressure can be explained by the assumed measurement uncertainty. When the difference in the formation pressure cannot be explained by the measurement uncertainty, evidence of hydraulic compartmentalization is concluded. Additionally, the disclosure specifically accounts for the measurement uncertainty and allow for incorporation of prior knowledge (such as the distribution of uncertainties, local knowledge from a human analyst, or from other physical measurements beyond pressure alone).

For the single-well scenario, the disclosure automates the pressure interpretation workflow and proposes different possible vertical compartmentalization models. For the multi-well scenario, aspects of the disclosure automatically finds evidence if a subset of wells with the same fluid type are not in lateral pressure communication, that is the wells are laterally disconnected.

Single-Well Algorithm Structure

When working with data from a single well, one method of the disclosure may use a changepoint model in which the location of changes are unknown parameters to be learned, and where the prior information about the reservoir and tool specifications are encoded into prior distributions about unknown parameters. The tool specifications, such as depth and pressure gauge repeatability, and/or calibration logs are used to construct a prior distribution on the measurement uncertainty or to fix the measurement uncertainty for each observation. By explicitly accounting for measurement uncertainty, the discovered changes indicate depths at which the measurement uncertainty cannot fully explain the change. That is, the method discovers locations where there is evidence that the change in pressure data is due to a physical phenomenon, such as a change in fluid type or there being two disconnected fluid zones.

To incorporate knowledge about the measurement uncertainty, information pressure measurements are modeled as random variables, with expected values given by E(y) and variance Var(y). Under this framework, the general form of the changepoint model with K changes can be expressed as:

$$\mathbb{E}(y_n) = f_k(x_n; \theta_k) \text{ for } \tau_{k-1} < x_n \leq \tau_k, k = 1, \ldots K, \quad (1)$$

$$\text{Var}(y_n) = \sigma_n^2 \quad (2)$$

where $(x_n, y_n)$ are the nth observed depth and pressure measurement, $f_k$ is the pressure model for the kth segment, $\theta_k$ are the model parameters for the kth segment, $\tau_k$ is the kth changepoint for k=1, ..., K, and $\sigma_n^2$ is the uncertainty of the nth pressure measurement Depending on the amount of knowledge about the reservoir, the unknown parameters are: $\theta_k, \tau_k, \sigma_n^2$, K, for k=1, ..., K. The output of the method is at least the inferred changepoints, $\tau_k$, which indicate the depths in which pressure data changes. That is, the inferred changepoints delineate different zones of the pressure data. The zones may represent different hydraulic zones, and they may represent zones of different fluid types which may share a fluid contact near the inferred changepoint depth. The number of changepoints can be assumed or unknown and take on values greater than or equal to zero. In the case of zero changepoints, all the pressure data is described by a single model and the two changepoints would be the first and last ordered input measurement.

In other embodiments of the method, $x_n$ can be a multi-dimensional vector of input measurements and $y_n$ can be a multi-dimensional vector of dependent measurements. For example, $y_n$ could comprise a set of measurements of formation pressure and other physical measurements that may include, but are not limited to, fluid density, fluid mobility, fluid compositional analysis, gas-oil ratio, and optical density of the formation fluids. Physical measurements may also include petrophysical logs, such as natural gamma ray measurements, neutron porosity, formation bulk density and its derived quantities, formation elemental concentrations, macroscopic nuclear cross sections, electrical resistivity, acoustic velocities, elastic moduli, or other petrophysical measurements that are known in the art. Any of these depth-dependent measurements may be acquired as station measurements that are acquired while a probe is stationary at various depths, as continuous logs from which the measurements are integrated over a depth range or are sampled at discrete points in depth, or from measurements on core samples that are acquired at various depths and are analyzed downhole or at the surface. Embodiments of the disclosure use pressure data to learn the location of changepoints while accounting for prior knowledge such as measurement uncertainty, possibly in combination with other physical measurements, different from conventional analysis.

The choice in the distribution for the pressure measurement takes into account knowledge about how the formation pressure measurements are obtained, such as Normal distribution or Student-T distribution. Selection of the pressure model for each segment, $f_k$, depends on what is known about the reservoir. If it is known that there is a single connected zone with multiple fluid types, a piecewise-continuous linear or quadratic model can be used for each segment. If little is known about the reservoir, but it is assumed that within each hydrostatic zone the pressure is proportional to the depth, the pressure model can be set to a linear function for all segments. As for the model parameters, $\theta_k$, any prior knowledge can be encoded into a prior distribution or can be used to fix the parameter value. Depending on the choice in the distribution for the formation pressure measurements and prior distribution, individual model parameters can be marginalized out. As previously mentioned, the pressure variance, $\sigma_n^2$, can be estimated and fixed or can be treated as an unknown parameter with prior distribution based on the tool specifications, calibration files, and/or any other prior knowledge. Based on the domain knowledge, assumptions can be further placed on the pressure variance, such as all measurements having the same variance, $\sigma_n^2 = \sigma^2$ for all n, or pressure measurements within the same segment have the same variance, $\sigma_n^2 = \sigma_n^2$ for $\tau_{k-1} < x_n \leq \tau_k$. Prior distributions on the changepoints and number of changepoints can be constructed from knowledge of the reservoir or using additional measurements.

To obtain the distribution of the changes, numerical methods such as Markov Chain Monte Carlo or Hamiltonian Monte Carlo, or exact computation methods can be used depending on the choice of the formation pressure distribution and the prior distributions for the model parameters. As the changes are random variables, multiple realizations of the changes, $(\tau_0, \tau_1, \ldots)$ can be sampled to output different explanations of the pressure data. In some embodiments the value of $\tau_0 = 0$.

Conditioning the changes or if the segment model parameters, $\theta_k$, are learned along with the changes, the different segments and changes can be further characterized. For example, if the model for the pressure data $f_k$ is linear for all segments, conditioning on a sequence of changes $(\tau_0, \tau_1, \ldots)$, a linear model can be fit to each segment and the fitted slope can be used to characterize the fluid type of each segment. The fitted slopes and intercepts can then be used to determine if the change corresponds to two disconnected zones or a single connected zone that changes fluid type (i.e., single zone with oil on top of water).

When measurements in addition to the pressure data are available, such as downhole fluid measurements or other petrophysical logs as previously noted, the additional measurements can be absorbed by the method through the prior placed on the changepoints and the other tunable model parameters. For example, in the case of a linear model, if a downhole fluid sample is taken at a specific depth, the prior for the slope of the corresponding segment can be centered around the measured fluid density. Gamma ray logs or other petrophysical logs can be used to set a prior distribution on the changes.

In other embodiments, a hierarchical structure can be placed on the model parameters, $\theta_k$. That is, rather than modeling the variable as a random variable with known distribution parameters, the distribution parameters are modeled as random variables themselves. Additionally, a hierarchical structure can be placed on arguments of the pressure model, $x_n$. That is, rather than treating the arguments as fixed and known quantities, they can be treated as random variables. For example, rather than using the measured depth, $x_n$, as the argument for the pressure model, the unknown true depth, $z_n$, can be used, in which the true depth is modeled as a Normal random variable centered around the measured depth. In this case, the changepoint model would have the form:

$$\mathbb{E}(y_n) = f_k(z_n; \theta_k) \text{ for } \tau_{k-1} < x_n \leq \tau_k, k = 1, \ldots K, \quad (3)$$

$$\mathbb{V}\mathrm{ar}(y_n) = \sigma_n^2 \quad (4)$$

$$z_n \sim \text{Normal}\left(x_n, \sigma_z^2\right) \quad (5)$$

This model formulation is consistent with the Berkson error model.

Single-Well Algorithm Example

One example implementation of a single-well algorithm can be illustrated with simulated pressure data. The simulated data are motivated by realistic scenarios and have data quality that is typical of real measurements. For this example, it is assumed that the pressure measurements are normally distributed around the forward model, $f_k$, with homogenous measurement uncertainty, $\sigma_n^2 = \sigma^2$. In embodiments, the measurement uncertainty is calculated using the depth repeatability and the pressure gauge repeatability. In embodiments, little may be known about the reservoir structure, except that pressure in each segment is proportional to the depth, $f_k(x_n; \alpha_k, \beta_k) = \alpha_k + \beta_k x_n$, for all k. To obtain a distribution over the changepoints, an exact computation method is used for an unknown number of changes.

Figure 1:
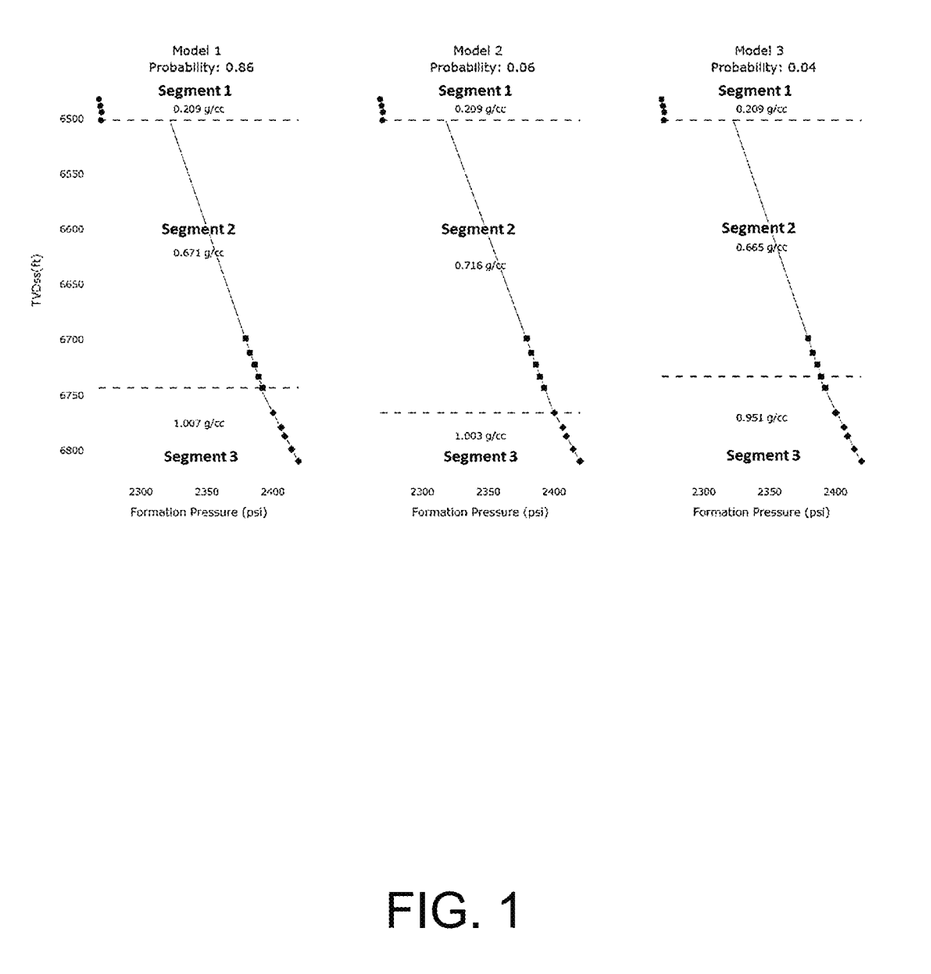
FIG. 1 is an example of three most probable models for the pressure data when little is known about the reservoir structure.

The three most probable descriptions of the simulated pressure data are shown in FIG. 1. The learned changepoint depths are represented by the dashed horizontal lines. The estimated fluid density for each segment obtained by least squares regression is labeled in the figure. The three top models all identify the same changepoint between Segment 1 and Segment 2 but differ in the location of the changepoint between Segment 2 and Segment 3. The results in Model 1 and Model 2 are consistent with the ground truth that was used to generate the simulated data.

Figure 2:
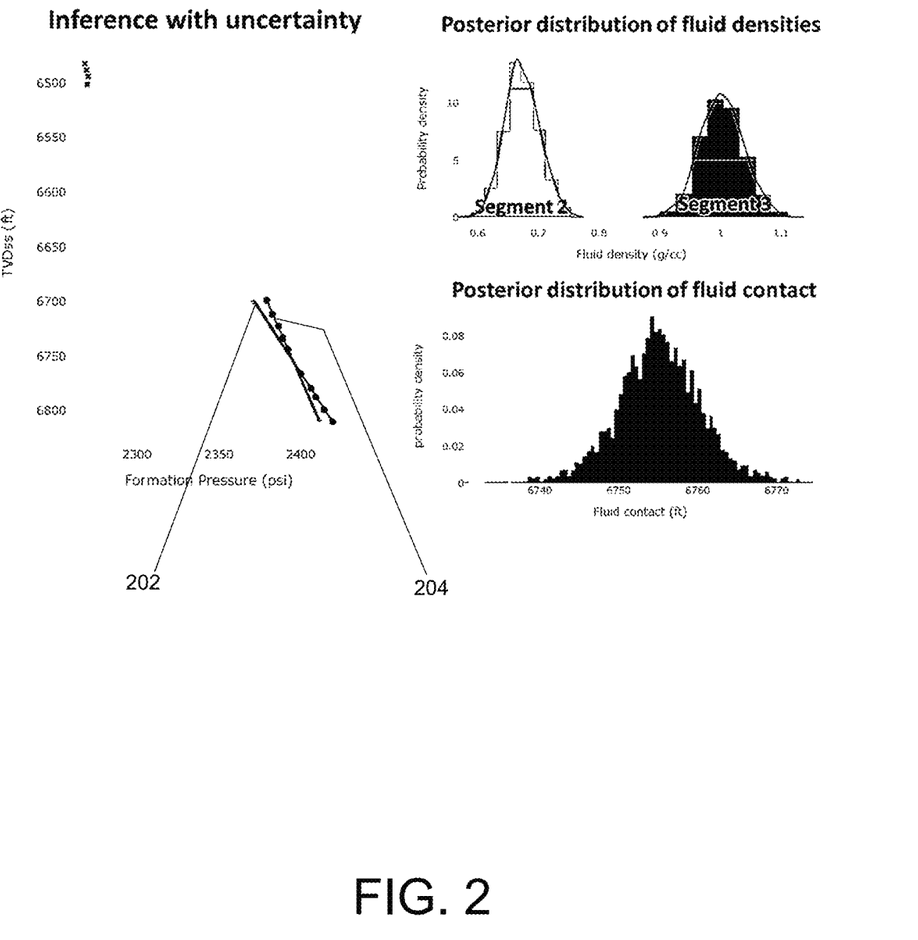
FIG. 2 is an example of displays indicating learned trends and distributions.

Using the knowledge obtained from the changepoint detection method, the method sub-selects the data in the lower two segments and assumes a fluid contact exists between the two segments. This entails updating a pressure model, $f_1$, $f_2$, to a piecewise continuous linear model with a single change. Using a sampling method, a continuous depth for the fluid contact and the segment fluid densities are inferred, as shown in FIG. 2. The inferred piecewise continuous linear model is shown in the left panel of FIG. 2, where the ribbon 202 and ribbon 204, corresponds to the uncertainty in the trend to describe the upper and lower segment, respectively. The right side of FIG. 2 displays the learned distributions for the fluid densities (top) and that of the fluid contact (bottom). This step of including newly inferred information can be automated by employing logic rules and/or other decision-making methods.

Multi-Well Algorithm Structure

The disclosure includes methods to model pressure data from multiple wells. In its most general form, the novel aspects of these multi-well methods include the use of the following components: a model for the pressure data that accounts for measurement uncertainty, an estimate of the total assumed measurement uncertainty, and a method to quantify the pressure difference between wells relative to the uncertainty. It will be understood that the family of models that satisfy the novel criteria can have many variations in their structure.

As one non-limiting example, a multi-well pressure algorithm can take the following form, discussed below. The model for the pressure data is a linear model with a hierarchical structure on the y intercept term to account for the within-well uncertainties, $\sigma_x^2$ and $\sigma_y^2$, (representing the repeatability of the depth and pressure measurements, respectively, within one well using the same measurement devices), and between-well uncertainties, $S_x^2$ and $S_y^2$ (representing the accuracy of the depth and pressure measurements, respectively, when comparing data from different measurement devices). For the nth measurement from the ith well, the pressure model is:

$$\mathbb{E}(y_{i,n}) = \alpha_i + \beta x_{i,n}, \ \mathrm{Var}(y_{i,n}) = \beta^2 \sigma_{x_i}^2 + \sigma_{y_i}^2 \quad (6)$$

$$\mathbb{E}(\alpha_i \mid \beta) = \mu_\alpha, \ \mathrm{Var}(\alpha_i \mid \beta) = \beta^2 S_{x_i} + S_{y_i}^2 + S^2 \quad (7)$$

where the subscript i denotes properties of the ith well, $(x_{i,n}, y_{i,n})$ is the nth measured depth and pressure data from well i, $\alpha_i$ and $\beta$ are the unknown linear regression parameters, $\mu_\alpha$ is the unknown y-intercept of the global trend, and S is the unknown additional uncertainty that would need to be assumed in order to explain lateral connectivity for the wells. If all wells are laterally connected, it is expected that the value $S^2$ will be small, as the shift in the local trend can be accounted for by the known between-well uncertainties. In this pressure model, the variation of the measurements around the linear trend is controlled by the within-well uncertainty, and the variation of linear trend around a global trend is controlled by the between-well uncertainty. In other embodiments, a model for the pressure data can be structured as follows. For the nth measurement from the ith well, $$\mathbb{E}(y_{i,n}) = (\alpha_i + S_{y_i}) + \beta z_{i,n}, \ \mathrm{Var}(y_{i,n}) = \sigma_{y_i}^2 \quad (8)$$

$$\mathbb{E}(z_{i,n}) = x_{i,n} - S_{x_i}, \ \mathrm{Var}(z_{i,n}) = \sigma_{x_i}^2 \quad (9)$$

where $z_{i,n}$ the true unknown depth of the measured value $x_{i,n}$ and all other parameters have the same meaning as the model given in Equations 6 and 7. This formulation is consistent with the Berkson error model.

If there are multiple possible models to describe the pressure data, all models can be fit to the data using the method to quantify the pressure difference between wells and its uncertainties, and then the best model can be selected. Several methods are possible to score and rank the competing models, including but not limited to model-selection statistics (such as the Bayes Factor), the predictive accuracy of the models, an expert opinion, or relevant physical constraints.

The second component is an estimate for the total assumed measurement uncertainty. This can come directly from the assumed pressure model and the tool specifications and/or calibration. It can be both depth and pressure dependent. Alternatively, it can come from an expert or a group of experts. An example is estimating the total assumed measurement uncertainty by two standard deviations of the difference in the predicted pressure between Well and Well j, $\hat{y}_{i,n}$ and $\hat{y}_{j,n}$ respectively, given the assumption that the wells are laterally connected:

$$2 * \sqrt{\mathrm{Var}(\hat{y}_{i,n} - \hat{y}_{j,n} \mid \text{Well } i \ \& \ \text{Well } j = \text{connected})}.$$

The third component is a method to quantify the pressure difference between wells relative to the uncertainty. This could be done by learning the distribution of the predicted pressure difference through Bayesian methods. This entails, first, placing prior distributions on the unknown model parameters in which the prior distributions encode prior knowledge about the reservoir and/or uncertainties. Then, using either numerical methods or exact computation, the distribution is learned for the model parameters that honors both the data and the encoded knowledge. Using the learned distribution, the distribution for the predicted pressure at each depth can be computed or approximated, and for pairs of wells distributions for the difference in parameters and in predicted pressure can be computed or approximated.

Once all these components are established, the multi-well algorithm can be structured in various ways. In one formulation of the algorithm, evidence for disconnectedness between pairs of wells can be concluded and graded using the learned pressure difference and the total assumed measurement uncertainty. One approach is to use the difference in the predicted pressure. At a given depth, if the difference in the predicted pressure is completely contained within the interval defined by the total assumed measurement uncertainty, then evidence for the wells being laterally disconnected cannot be concluded as the difference in predicted pressure can be explained by the measurement uncertainty. Whereas, if the difference in the predicted pressure is completely outside the interval defined by the total measurement uncertainty, then evidence for the wells being laterally disconnected can be concluded. Furthermore, this evidence can be graded based on the uncertainty in the difference in predicted pressure and how it compares with the total assumed measurement uncertainty interval. A summary statistic of the evidence and grade can be taken over all depths to obtain a single answer. Another approach would be to use the difference in a specified parameter or transformation of parameters. Such a parameter would need to have a physical interpretation. For example, if the linear hierarchical model from above is used to describe the pressure data, the y-intercept term can be used as it denotes the offset in the formation pressure.

In other embodiments, evidence for lateral compartmentalization for pairs or subsets of wells can be obtained by comparing the total assumed measurement uncertainty with the learned parameters or their transform. For instance, if the pressure model has a parameter or transformation of parameters that estimate the fluid density for each well and one that estimates the pressure offset for each well, logic rules based on learned/transformed distributions and the estimated assumed measurement uncertainty can be constructed to conclude evidence. For the case of a linear pressure model with unique slope and unique intercept for each well, a possible logic rule to conclude evidence of a subset of wells being laterally disconnected is that the learned distributions for the individual slopes need to overlap, but all the learned distributions for the individual intercepts are not within the total assumed measurement uncertainty of each other. That is, all wells have equivalent fluid but the offsets in pressure are greater than the total assumed measurement uncertainty.

In other embodiments, not all pressure data needs to be acquired before production or injection of fluids in a reservoir. When the data from one well was taken prior to production and the other post-production, a pressure offset that exceeds known measurement uncertainties provides evidence the wells are laterally connected, as opposed to an interpretation that the wells are laterally disconnected when the data from both wells was obtained prior to production. Logic rules and other decision-making methods can be employed to automate the interpretation of the pressure offset based on when the pressure data was obtained.

Multi-Well Algorithm Example

Figure 3:
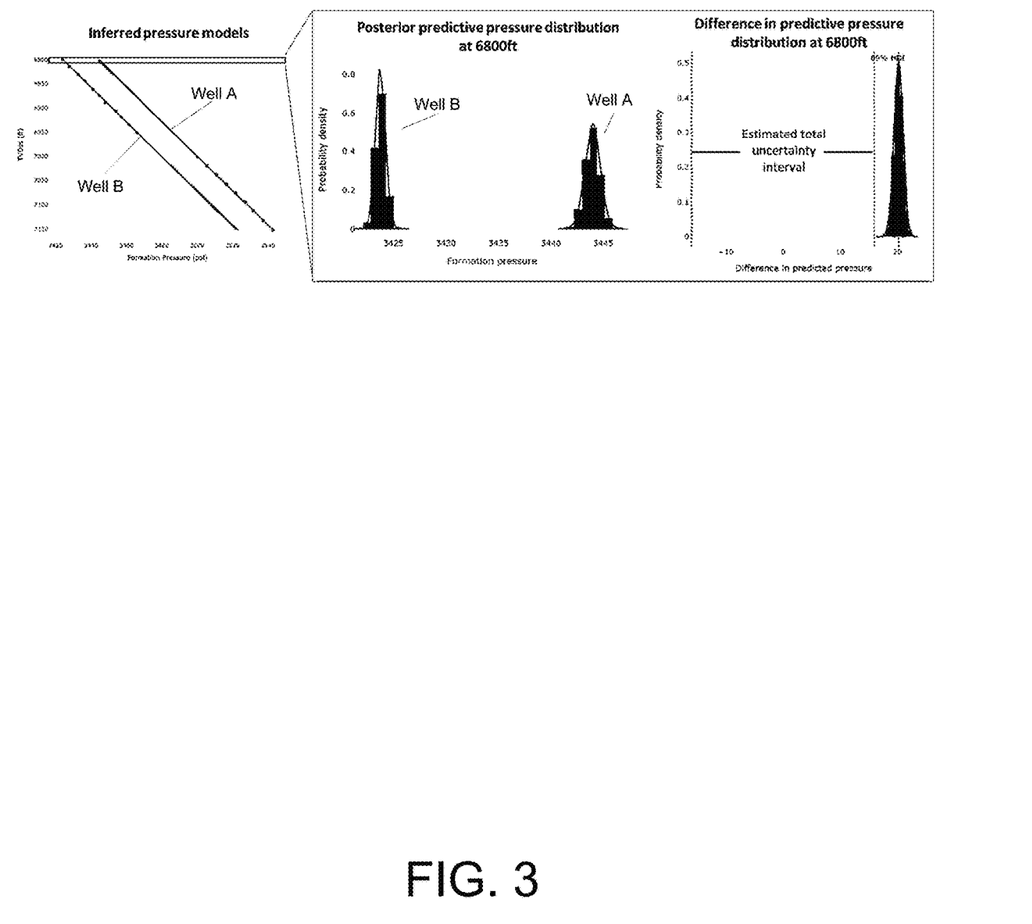
FIG. 3 is an example of pressure models.

An example of the multi-well algorithm on simulated data is shown in the left frame of FIG. 3. In this example, there is an interest to determine if Well A and Well B are laterally disconnected.

In this example, the linear pressure model with a hierarchical structure on the y-intercept is used, given above in Equations 6 and 7. Note that in this model, all wells share the same slope, β, i.e., the zones being compared between wells are assumed to have the same fluid density. An alternative model would be that each well has its own fluid density, $β_i$, rather than β.

It is estimated that the total assumed uncertainty by two standard deviations of the predicted pressure difference assuming the two wells are laterally connected:

$$2 * \sqrt{\text{Var}(\hat{y}_{i,n} - \hat{y}_{j,n} | \beta, S = 0)}.$$

Assuming independence between y-intercepts and the within well and between-well uncertainties conditional on β, the total assumed uncertainty in terms of the within-well and between-well uncertainties is:

$$\text{Var}(\hat{y}_{i,n} - \hat{y}_{j,n} | \beta, S = 0) = \tag{10}$$
$$\beta^2 (S_{x_i}^2 + S_{x_j}^2) + (S_{Y_i}^2 + S_{Y_j}^2) + \beta^2 (\sigma_{x_i}^2 + \sigma_{x_j}^2) + (\sigma_{y_i}^2 + \sigma_{y_j}^2)$$

The within-well uncertainties and the between-well uncertainty values are fixed to those values found in the tool specifications and/or calibration files.

A Bayesian approach is taken to quantify the pressure difference between wells relative to the uncertainty. First, all unknown parameters are assigned a prior distribution. Using a sampling algorithm, posterior distributions are obtained for the unknown model parameters assuming a model with a common slope, β and individual slopes for each well, $β_i$. Each model is compared using its predictive accuracy on the pressure data to find that both models can equivalently describe the data. Hence, it can be assumed that both wells have the same fluid density, because a common slope is sufficient to describe the data. The learned model is displayed in the left frame of FIG. 3.

Using the posterior distributions that arise from the assumption of a common slope, the posterior predictive distributions are estimated for the pressure of Well A and Well B at a measured depth and their difference. The center and right frames of FIG. 3 show an example of these posterior predictive distributions and their difference distribution at the shallowest depth of 6800 feet. In the difference plot (right side of FIG. 3), the dotted vertical lines denote the interval created by the estimated total assumed uncertainty.

At the shallowest depth, the posterior predictive distribution is fully outside the assumed measurement uncertainty interval, indicating that the difference in the predicted pressure between Well A and Well B cannot be explained by measurement uncertainty. This scenario provides evidence the wells are laterally disconnected. The strength of this evidence may be quantified by computing the proportion of the posterior predictive distribution that overlaps with an interval, for example the overlap with the estimated uncertainty interval. The fact that the overlap is nearly zero in this example may be interpreted as strong evidence for disconnectedness between wells. By contrast, a high fraction of overlap in another scenario could be interpreted as a lack of evidence for the wells being disconnected. This computation may be performed for all measurement depths and extrapolating at all depths, to determine if there is evidence the wells are laterally disconnected at any depth.

Figure 4:
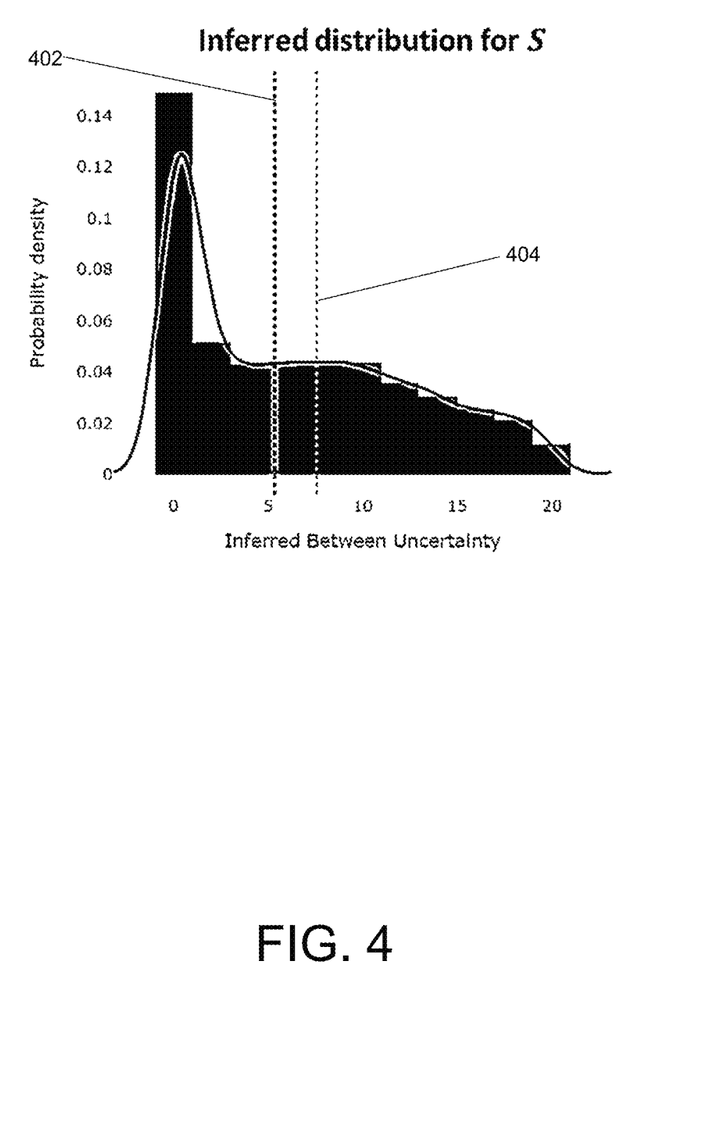
FIG. 4 is an example of an inferred distribution.

An alternative method to conclude evidence for the two wells being laterally disconnected uses the learned distribution of between-well uncertainty, S, and the estimated total assumed uncertainty. As previously discussed, the between-well uncertainty, S, is an inferred parameter that represents the additional uncertainty that would be needed beyond the known sources of uncertainty to account for the pressure differences between wells. The learned distribution for S is shown in FIG. 4, where the estimated total assumed uncertainty value is denoted by the vertical dotted line 402 and the posterior median is indicated by the dotted black line 404. Because a significant amount of the mass of the distribution for S is larger than the total assumed uncertainty and is away from 0, it can be concluded by the evidence that the wells are laterally disconnected. By contrast, if a high fraction of the S distribution mass was concentrated near zero, then it would imply no evidence for disconnectedness, because the known sources of uncertainty were sufficient to explain the inter-well pressure differences.

Figure 5:
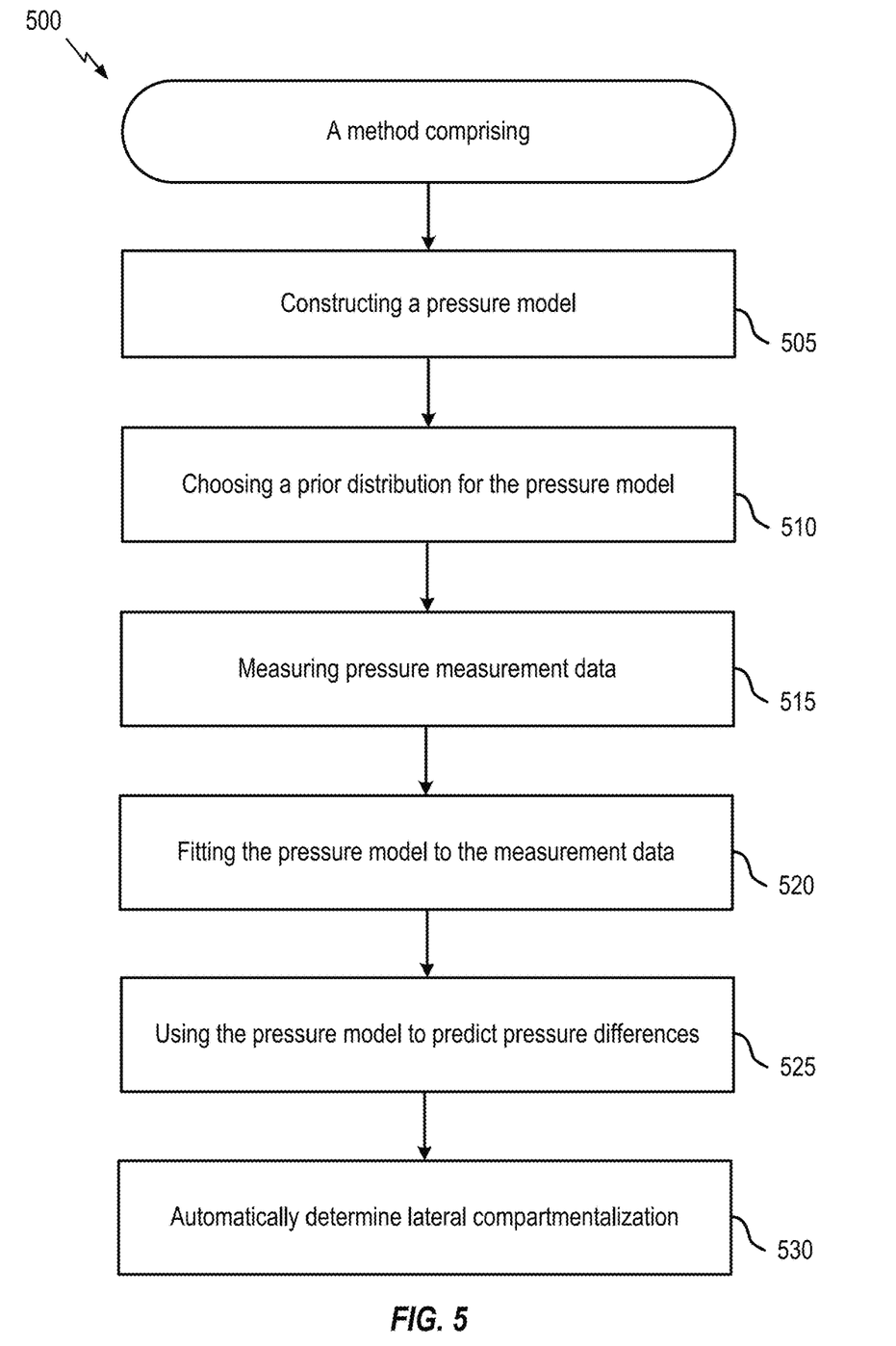
FIG. 5 is an example workflow.

Example embodiments of the claims are disclosed. This recitation of the claims should not be considered limiting. In one example embodiment illustrated in FIG. 5, a method 500 for delineating and interpreting a spatial distribution of fluid bodies within a reservoir is disclosed. The method 500 combines domain expert knowledge and knowledge of measurement uncertainties with pressure measurement data (at 515). The method 500 may comprise constructing a pressure model, at 505, that accounts for measurement uncertainty. The method may further comprise choosing a prior distribution, at 510, on unknown model parameters. The method may further comprise fitting data, at 520, to the model to produce a fitted model. The method may further comprise using the fitted model, at 525, to draw evidence on at least one of a fluid type, a locating feature of the at least one fluid body, vertical compartmentalization, and lateral compartmentalization at 530.

In another example embodiment, the method may be performed wherein the uncertainty in the measured data is captured within a likelihood function relating the pressure model and the measurement uncertainty.

In another example embodiment, the method may be performed wherein the model includes a function that models the uncertainty in the measurement data.

In another example embodiment, the method may be performed wherein the model accounts for precision for repeated measurements by an instrument in a same well, and accuracy for comparison of measurements by different instruments, in different wells.

In another example embodiment, the method may be performed wherein the measurement uncertainties include uncertainty on measured depth, on measured pressure, and other physical measurements.

In another example embodiment, the method may be performed wherein at least one model parameter is fixed based on at least one of domain knowledge and other available data.

In another example embodiment, the method may be performed wherein the pressure data are modeled for a single well.

In another example embodiment, the method may be performed wherein the pressure data are modeled for multiple wells.

In another example embodiment, the method may be performed wherein a comparison of pressure among selected zones for the multiple wells is performed.

In another example embodiment, the method may be performed wherein the model parameters are indicative of a fluid type.

In another example embodiment, the method may be performed wherein the model parameters include at least one of a location of changepoints in depth-dependent data, a delineation of hydraulic zones, and a location of fluid contacts.

In another example embodiment, the method may be performed wherein the model parameters include an unknown source of uncertainty that is required to explain differences in pressure trends between wells.

In another example embodiment, the method may be performed wherein the evidence for vertical compartmentalization is interpreted based on the fitted model and logic rules.

In another example embodiment, the method may be performed wherein the model uses at least one of fluid densities and pressure differences.

In another example embodiment, the method may be performed wherein the evidence for lateral compartmentalization is interpreted based on the fitted model and logic rules under an assumption of a reservoir that has not been disturbed by any production or injection of fluids.

In another example embodiment, the method may be performed wherein the evidence for lateral compartmentalization is interpreted on the fitted model and logic rules under an assumption of a reservoir in which one of production and injection has already begun.

In another example embodiment, the method may be performed wherein the data being modelled includes pressure in combination with other physical measurements, including at least one of fluid density, fluid mobility, fluid compositional analysis, gas-oil ratio, and optical density of the formation fluids.

In another example embodiment, the method may be performed wherein the pressure and the other physical measurements carry information on reservoir compartmentalization, a delineation of hydraulic zones, a location of fluid contacts, and a location of changepoints.

In another example embodiment, the method may be performed wherein depth-dependent measurements are acquired as at least one of stationary measurements, as continuous downhole logs, and from measurements on core samples.

In another example embodiment, the method may be performed wherein the model is used to recommend acquisition of new pressure measurements in at least one specific range of location.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A method for delineating and interpreting a spatial distribution of fluid bodies within a reservoir that combines domain expert knowledge and knowledge of measurement uncertainties with pressure measurement data, the method comprising:

constructing a pressure model of pressure, at a given depth in a given well, as a function of a pressure gradient at the given depth, an in-well depth measurement uncertainty, a between-well depth measurement uncertainty, an in-well pressure measurement uncertainty, and a between-well pressure measurement uncertainty;

choosing a prior distribution of the pressure gradient, the between-well pressure measurement uncertainty, and the between-well depth measurement uncertainty, wherein the choosing is based on the domain expert knowledge associated with the reservoir and the knowledge of the measurement uncertainties;

measuring the pressure measurement data, wherein the measuring includes, for each well of a plurality of wells associated with the reservoir, measuring pressure at a plurality of depths using a plurality of pressure gauges;

fitting the pressure measurement data to the pressure model to produce a fitted model, wherein the fitting the pressure measurement data includes adjusting one or more of the pressure gradient, the between-well pressure measurement uncertainty, or the between-well depth measurement uncertainty;

using, by one or more processors, the fitted model to predict one or more pressure differences of one or more pairs of wells, of the plurality of wells, at one or more depths; and automatically determining, by the one or more processors, lateral compartmentalization associated with the one or more pairs of wells based on the predicted one or more pressure differences.

2. The method of claim 1, wherein the knowledge of the measurement uncertainties comprises a likelihood function relating the pressure model and the measurement uncertainties.

3. The method of claim 1, wherein the in-well depth measurement uncertainty and the in-well pressure measurement uncertainty account for precision for repeated measurements by an instrument in a same well, and wherein the between-well depth uncertainty and the between-well pressure measurement uncertainty account for accuracy for comparison of measurements by different instrument in different wells.

4. The method of claim 1, further comprising:
- constructing a second pressure model of pressure, at a given depth in a single well, as a function of the pressure gradient at the given depth, the in-well depth measurement uncertainty, and the in-well pressure measurement uncertainty; and
- automatically determining, by the one or more processors, vertical compartmentalization based on the second pressure model.

5. The method of claim 4, wherein the automatically determining vertical compartmentalization is based on a fitted model of the second pressure model and on logic rules.

6. The method of claim 5, wherein the pressure model uses fluid densities.

7. The method of claim 1, further comprising comparing pressure among selected zones for the plurality of wells.

8. The method of claim 1, wherein one or more parameters of the pressure model are indicative of a fluid type.

9. The method of claim 1, wherein one or more parameters of the pressure model include at least one of: a location of changepoints in the pressure measurement data, a delineation of hydraulic zones, or a location of fluid contacts.

10. The method of claim 1, wherein the automatically determining lateral compartmentalization is interpreted based on the fitted model, logic rules, and an assumption that the reservoir has not been disturbed by any production or injection of fluids.

11. The method of claim 1, wherein the automatically determining lateral compartmentalization is interpreted based on the fitted model, logic rules, and an assumption that production or injection of fluids in the reservoir has already begun.

12. The method of claim 1, wherein the fitting the pressure model is further based on other physical measurements, including at least one of: fluid density data, fluid mobility data, fluid compositional analysis data, gas-oil ratio data, or optical density data of one or more formation fluids.

13. The method of claim 12, wherein the pressure measurement data and the other physical measurements are associated with a delineation of hydraulic zones, a location of fluid contacts, and a location of changepoints.

14. The method of claim 12, wherein pressure measurement data and the other physical measurements are acquired as at least one of: stationary measurements, continuous downhole logs, or measurements on core samples.

15. The method of claim 1, further comprising recommending acquisition of new pressure measurements in at least one specific range of location based on the fitted model.

* * * * *